June 14, 1966   P. S. ROLLER   3,256,162
METHOD FOR THE ELECTROLYTIC PRODUCTION OF METAL HYDROXIDES
Filed March 2, 1962   2 Sheets-Sheet 1
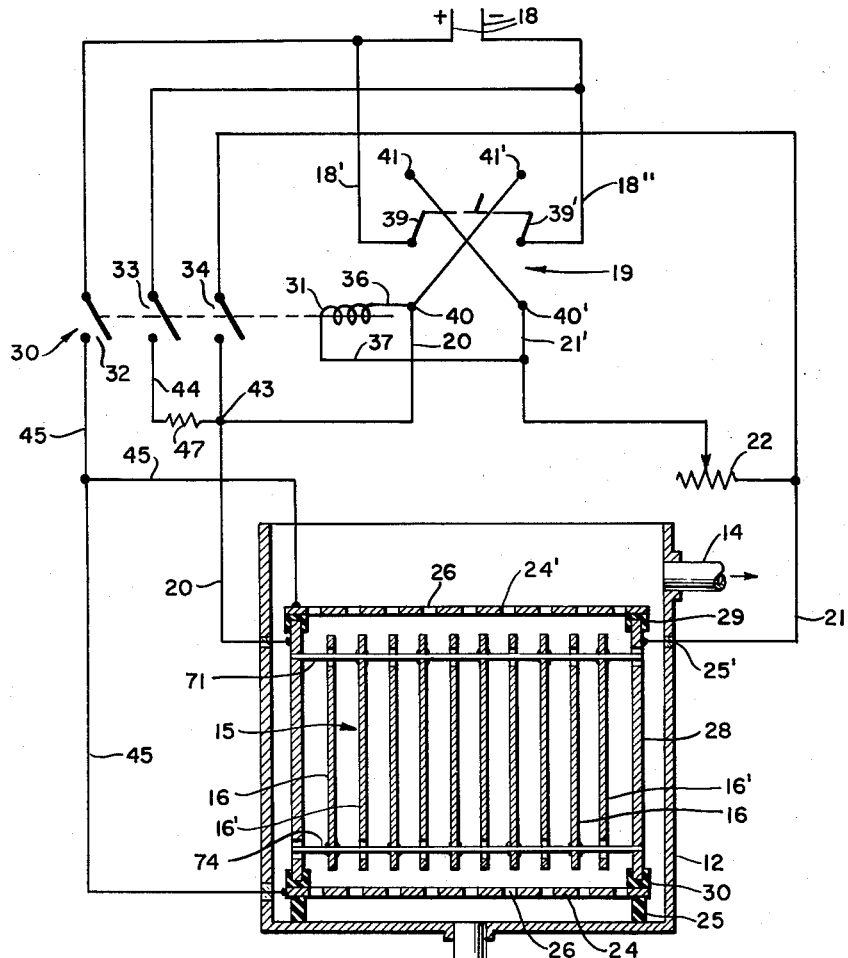
FIG. 1.
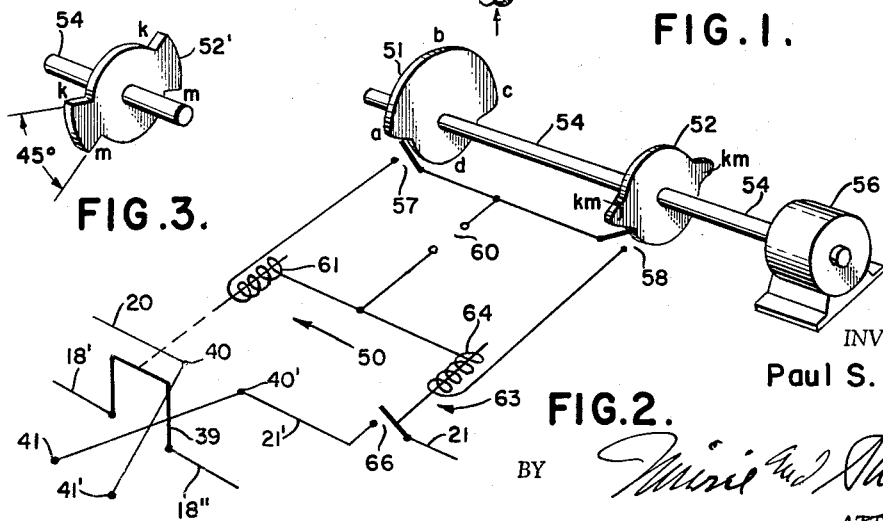
FIG. 3.
FIG. 2.
INVENTOR
Paul S. Roller
BY
ATTORNEY United States Patent Office 3,256,162
Patented June 14, 1966

3,256,162
METHOD FOR THE ELECTROLYTIC PRODUCTION OF METAL HYDROXIDES
Paul S. Roller, 4021 9th St. NW., Washington, D.C.
Filed Mar. 2, 1962, Ser. No. 177,082
2 Claims. (Cl. 204—96)

The invention relates to the electrolytic production of metal hydroxide, and in particular to the prevention of electrode deterioration marked by excessively rising voltages.

When metals whose hydroxides are insoluble in water are made anode in an electrolytic cell containing water, metal hydroxide is formed at the anode while hydrogen gas is liberated at the cathode. For water purification employing said metal hydroxides as coagulants, the metals primarily of interest are aluminum and iron. The hydroxides are respectively aluminum and iron, with the iron being in the desired ferric state in the presence of an oxidizing agent in the water.

The efficient electrolytic production of metal hydroxide has been beset with difficulties, of which the two most important have been overcome by improvements set forth in my Patents U.S. 3,006,826 and 2,919,235 pertaining to electrode film removal and U.S. 2,860,090 pertaining to current reversal with electrode depolarization.

I have now discovered another important factor controlling the electrolytic efficiency, to the effect that the electrodes are in a sensitive state as a result of prior electrolytic use. When after such use the current is disconnected, they are subject to an accelerated oxidation or anodization, which reveals itself in a jump in voltage upon resuming the electrolysis at the original current.

The voltage rise upon current disconnect may be temporary or permanent. If the current is disconnected very few times during the early stage of electrolysis, within about the first twenty hours or so, the voltage rise will be small and will be overcome by a reverse effect caused by the electrolysis itself when it is resumed. On the other hand, if the current disconnects are frequent in the early stages, or if there is only one current disconnect after prolonged electrolysis, say after 120 hours, the net voltage rise will be high and permanent.

In the instance of a permanent effect, for restoration of the original low voltage, I re-activate the electrodes in accordance with my U.S. 3,006,826.

Long standing of the electrodes without use also results in an oxidation, more particularly in the instance of iron than of aluminum. This is also overcome, in the course of subsequent electrolysis, by the restoration effect thereof. However, if standing is prolonged, re-activation of the electrodes will be required.

In order to obviate the oxidation of the electrodes electrolytically induced by current stoppage or on prolonged idle standing, a reducing solution may be added to the water containing the cells, such as ferrous sulfate, hydrazine, or the like. However, I regard this as impractical because of the special attention required and of contamination of the water. Contamination will be particularly noticeable where current interruptions are frequent, as in certain process conditions.

The accelerated oxidation and resultant deterioration of the electrodes caused by prior electrolytic use as hereinabove described, and to my knowledge never heretofore noted, form the cogent origin of the present invention. It accordingly is concerned with overcoming said electrode deterioration by maintaining during periods of current disconnect an immediate reducing condition at the electrodes that is automatic and avoids the use of any dissolved chemicals for the purpose. Underlying the method, the electrodes are all of the same metal and the anodes alternate with the cathodes by current reversal.

It is an object of the invention to provide for combining the electrodes of an electrolytic cell of the character described into a common cathode relative to an anode separately disposed, during periods of current disconnect.

Another object is to provide for cathodic protection of the electrodes of a metal hydroxide-producing cell during intervals in which the current is off.

A further object is to provide for depolarization of the electrodes, as is desired in accordance with my U.S. 2,860,090, during such cathodic protection.

With these and other objects in view, as will become more apparent from the description, for a better understanding of the invention, reference is made to the drawings, in which:

FIG. 1 is a diagrammatic cross-sectional view vertically through a metal hydroxide-producing cell with an included separate anode, and a circuit diagram pertaining to electrode cathodic polarization with simultaneous depolarization of the electrodes;

FIG. 2 is a fragmentary view in perspective of automatic switch means and circuit diagram as required for automatic operation;

FIG. 3 is a fragmentary perspective view of a modified cam for corresponding inclusion in FIG. 2 when operating with alternate cells;

In the figures, like numbers refer to similar parts throughout.

Figure 4:
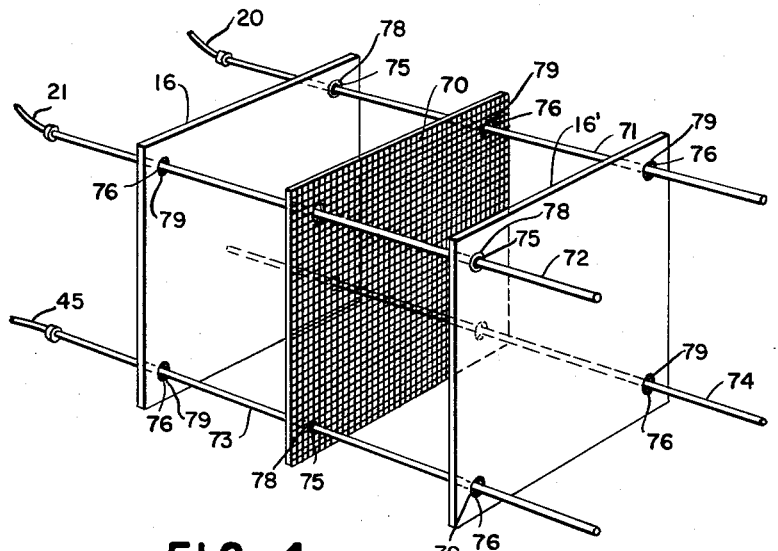
FIG. 4 is a fragmentary, exploded view in perspective of an alternate arrangement of said separate anode and the cell electrodes.

Referring in detail to the drawings, specifically to FIG. 1, insulated receptacle 12, provided with inlet conduit 13 and outlet conduit 14, contains electrolytic cell 15 comprising a plurality of similar anodes 16 and cathodes 16' in the form of plates mounted on bus rods 71–74, best shown in FIG. 4, carried by supporting terminals 28. Direct current supply 18 passes electrolyzing current to cell 15 through reversing and disconnect switch 19 and leads 20 and 21. Variable resistor 22 in this circuit controls the magnitude of the current passing to said cell.

Separate anode means such as anode 24 is of any suitable conducting material, preferably electrolytically stable, such as stainless steel, carbon, platinized titanium or the like. In one form it comprises anode plates disposed transversely to electrodes 16 and 16', below, above or to the sides, preferably in opposite pairs. In the illustration, separate anode 24 in the form of a plate is mounted below cell 15, and similar separate anode 24' is mounted above the cell, transversely in each instance to anodes 16 and cathodes 16'. Separate anodes 24 and 24', as for any plurality thereof, are connected electrically in parallel, and thus in effect constitute a unitary anode and may be so considered.

Separate anodes 24 and 24' are provided with openings 26 in order to allow passage for the water flowing through the cell 15. Openings 26 are obviously not required in the instance of anode 24 disposed below water inlet 13 repositioned, or in the instance of anode 24' disposed above water outlet 14 as shown, or in the instance that the separate anodes are disposed sidewise and transversely to the assembled anodes 16 and cathodes 16' in receptacle 12.

Separate anode 24 in the illustration serves as a sparger of the water entering receptacle 12. In this capacity, it serves also as a support for cell 15 which rests on it through the supporting terminals 28 having insulating bushings 30 on the ends in contact with said anode. The latter is supported on insulating blocks 25 in receptacle 12, while anode 24' may be suitably supported through insulating bushings 29 on the supporting terminals 28.

In a cycle of operations, cell 15 receives current in one direction through the closure of switch 19, it is depolarized and simultaneously cathodically polarized with respect to anode 24 when the switch is open, and receives current in reverse direction when the switch is closed in the opposite direction.

In particular, when switch 19 is closed with contacts 39 on terminals 40 and 40', positive current passes to cell 15 from the left by way of leads 18' and 20 and leaves by way of lead 21 to return through variable resistor 22 and lead 18". At the same time, coil 31 of relay 30 is energized by current passing to it through leads 36 and 37, so that the normally closed poles 32, 33 and 34 are opened.

After a pre-determined time of electrolytic current passage, switch 19 is opened by raising contacts 39', whereupon the current to cell 15 is disconnected, and coil 31 is de-energized causing the three said poles of relay 30 to close. The closure of pole 34 places a short across leads 20 and 21, whereby the electrodes 16 and 16' are mutually short-circuited and thus caused to depolarize. The closure of pole 32 causes positive or anodic current to pass to separate anodes 24 and 24' through resistor 47. The closure of pole 33 causes negative current to pass to short-circuited cell 15 through lead 44, junction 43 and lead 20, whereby the electrodes 16 and 16' are each cathodically polarized relative to anodes 24 and 24', the polarizing current being slight.

Subsequently, after a brief period of mutual electrode depolarization with overall cathodic polarization of the electrodes of cell 15, switch 19 is again closed, but with contacts 39 now on terminals 41 and 41'. Relay coil 31 is thereby again energized, causing poles 32, 33 and 34 again to open. Positive current now passes to cell 15 from the right through lead 21 returning through lead 20, that is, in reverse direction from before, thereby completing the cycle of electrolytic operation.

In the instance of a relatively long period of depolarization in which electrolytic current interruption can not be tolerated, two cells 15 and appurtenant circuits as hereinabove described are alternately employed synchronously, whereby one cell is in electrolytic circuit, while the other is being depolarized, and electrolytic continuity is thus maintained.

Instead of the manual sequence of operations which has been described, an automatic sequence may be effectuated for which purpose switch 19 is replaced by relays 50 and 63 and associated actuating cam-controlled switches 57 and 58 respectively, as shown in FIG. 2. The remainder of the circuit being the same, only the circuitry of said relays, alternate to that of switch 19, need be described. The cams 51 and 52 are mounted on shaft 54 rotated by motor 56. When lobe abc of cam 51 closes switch 57, a circuit is established through coil 61 of relay 50 from power source 60, causing said coil to energize, and contacts 39' to close on terminals 40 and 40'. Reciprocally, when lobe abc is over switch 57, the latter opens, and contacts 39' close on terminals 41 and 41', due to conventional relay-spring action. Lobes abc and adc being equal, reverse current accordingly passes to cell 15 in equal time intervals.

The reversal of current is interrupted in each instance by a period of depolarization and cathodic polarization as aforesaid when lobe km of cam 52 closes switch 58, synchronously with edges a and c of cam 51 being over switch 57. Coil 64 of relay 63 is thereby energized, causing pole 66 to open and electrolytic current to be disconnected from cell 15. Lobe km is very narrow so that the period of current disconnect is short or virtually negligible. During the non-passage of electrolytic current, cell 15 is depolarized and cathodically polarized as a result of opening the circuit through leads 21 and 37 to coil 31, and its de-energization as aforesaid.

If a longer period of depolarization is required, two similar cells 15 are employed and two sets of cams 51 and 52' for each. Cam 52', FIG. 3, is cut so that each lobe, km, kk and mm, subtends an angle of 45 degrees, whereby the period of depolarization and cathodic polarization is equal to the period of electrolytic current supply. Cam 51 and its associated cam 52' for one cell 15 are phased reciprocally to the corresponding cams 51B and 52'B for the alternate cell 15, that is to say 90° apart so that one cell is in electrolytic circuit while the other is in polarization with cathodic depolarization, whereby continuity of electrolytic output of metal hydroxide is achieved.

In a modification, shown in FIG. 4, separate anode 70 comprises a screen or lattice of inert metal or carbon as aforesaid which is mounted on bus rods 71, 72, 73 and 74 between each of opposed anodes 16 and cathodes 16'. Said bus rods make contact with said anodes and cathodes at openings 75 through connectors such as nuts 78, or clear them at openings 76 against insulating bushings 79. Lead 20 supplies current to anodes 16, lead 21 to cathodes 16' and lead 45 to separate anodes 70 as hereinabove described.

Figure 5:
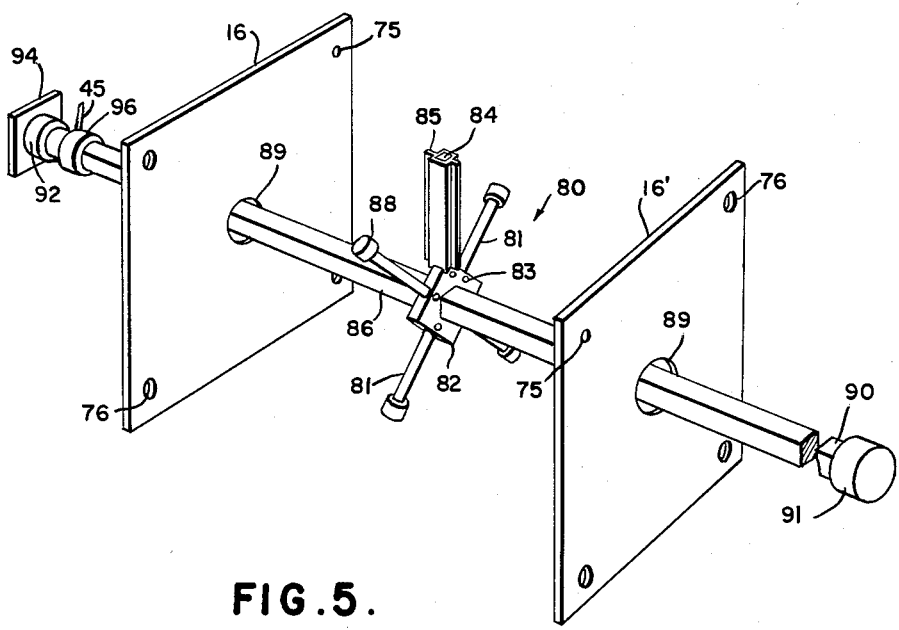
FIG. 5 is a fragmentary, exploded view in perspective of still another arrangement of separate anode and cell.

Electrodes 16, 16' and 70 are wiped or otherwise kept free of gelatinous films in accordance with my Patent U.S. 3,006,826, and as indicated in FIG. 5.

In another modification, shown in FIG. 5, separate anode 80 comprises arm-like, flattened members 81 attached to hub 82 by means of fastenings 83, and positioned between anodes 16 and cathodes 16'. Member 84 is similarly attached to hub 82 and supports wiper 85 which acts on said electrodes 16 and 16' during rotation of shaft 86 on which said hub is conductively mounted. Members 81 are rendered out of contact with electrodes 16 and 16' by insulating caps 88, of frictionless material such as Teflon, attached at their ends.

Shaft 86 which may be of square cross-section to accommodate hub 82 passes through apertures 89 in electrodes 16 and 16'. One end of said shaft fits securely into square-shaped sleeve 90 of shaft 91 that is attached to any suitable rotary drive. The other end is rounded and fits into the sleeve 92 of plate bearing 94 that may be dismountably attached with gaskets to a wall of receptacle 12.

Lead 45 is affixed to contactor 96, of cylindrical bore, that slides in conductive contact on the rounded end of shaft 86. Said shaft end and the bore of said contactor are of any suitable alloy capable of maintaining good electrical contact under water. Anodic current from lead 45 is passed to separate anode 80 through said contact and along shaft 86 and hub 82.

Having thus described my invention, it is understood that modifications may be made according to the skill of the art, which will fall within the spirit of the invention and the scope and terms of the subject matter as claimed.

What I claim is:

1. In the electrolytic production of insoluble metal hydroxide from metal electrodes and an aqueous liquid non-solvent to said metal hydroxide employing a cell of similar anodes and cathodes of said metal, the steps of applying electrolyzing current to said anodes and cathodes, disconnecting the current as required, during such periods of current disconnect metallically connecting said anodes and cathodes to form a common electrode, and making said connected electrodes cathodic to a separate anode.

2. In the electrolytic production of insoluble metal hydroxide from metal electrodes and an aqueous liquid non-solvent to said metal hydroxide employing a cell of similar anodes and cathodes of said metal, the steps of applying reverse electrolyzing current to said anodes and cathodes, interrupting the current between reversals, during such interruption metallically connecting said anodes and cathodes to form a common electrode, and making said connected electrodes cathodic to a separate anode.

References Cited by the Examiner

UNITED STATES PATENTS

| | | | |
|---|---|---|---|
| 2,289,258 | 7/1942 | French | 204—96 |
| 2,419,832 | 4/1947 | Gardiner | 204—231 |
| 2,584,816 | 2/1952 | Sands | 204—231 |
| 2,749,296 | 6/1956 | Banerjee et al. | 204—96 |
| 2,860,090 | 11/1958 | Roller | 204—96 |
| 2,919,235 | 12/1959 | Roller | 204—96 |
| 2,984,606 | 5/1961 | Bergmann | 204—96 |
| 3,006,826 | 10/1961 | Roller | 204—96 |

OTHER REFERENCES

Mantell: "Electrochemical Engineering"; 1960 publication, Reinhold; pages 51–70, copy in Scientific Library.

JOHN H. MACK, *Primary Examiner*.

MURRAY TILLMAN, *Examiner*.

G. KAPLAN, L. G. WISE, H. M. FLOURNOY,
*Assistant Examiners*.